United States Patent [19]

Yamaguchi et al.

[11] Patent Number: 5,110,783

[45] Date of Patent: May 5, 1992

[54] HYDROTREATING CATALYST AND METHOD FOR PREPARATION THEREOF

[75] Inventors: Hidefumi Yamaguchi; Hiroyuki Kiyofuji; Katsuhiro Shirono; Rinpei Tokuou; Jun Fuchigami, all of Kitakyushu, Japan

[73] Assignee: Catalysts & Chemicals Industries Co., Ltd., Tokyo, Japan

[21] Appl. No.: 701,266

[22] Filed: May 16, 1991

[30] Foreign Application Priority Data

May 22, 1990 [JP] Japan .................... 2-132389

[51] Int. Cl.⁵ ............... B01J 23/84; B01J 37/03; B01J 23/04
[52] U.S. Cl. ............... 502/314; 208/216 R; 208/254 H
[58] Field of Search ........... 502/314, 315, 322, 323, 502/327; 208/216 R, 216 PP, 217

[56] References Cited

U.S. PATENT DOCUMENTS

| | | | |
|---|---|---|---|
| 3,417,028 | 12/1968 | Montgomery et al. | 502/507 X |
| 3,992,324 | 11/1976 | Andre et al. | 502/314 X |
| 4,048,060 | 9/1977 | Riley | 208/210 |
| 4,145,316 | 3/1979 | Robson | 502/323 X |

FOREIGN PATENT DOCUMENTS

| | | | |
|---|---|---|---|
| 52-59094 | 5/1977 | Japan . | |
| 56-105754 | 8/1981 | Japan | 52-/ |
| 56-35893 | 9/1981 | Japan . | |
| 1510599 | 5/1978 | United Kingdom . | |

*Primary Examiner*—W. J. Shine
*Assistant Examiner*—Douglas J. McGinty
*Attorney, Agent, or Firm*—Panitch, Schwarze Jacobs & Nadel

[57] ABSTRACT

A catalyst is disclosed for hydrotreating heavy hydrocarbon oils, which catalyst comprises a catalyst component supported on an alumina carrier having an average fibrous particle length of 10-20 Nm and a specified proportion of fibrous alumina particle in that range of particle lengths. A process is also disclosed for preparing such hydrotreating catalyst.

4 Claims, 2 Drawing Sheets

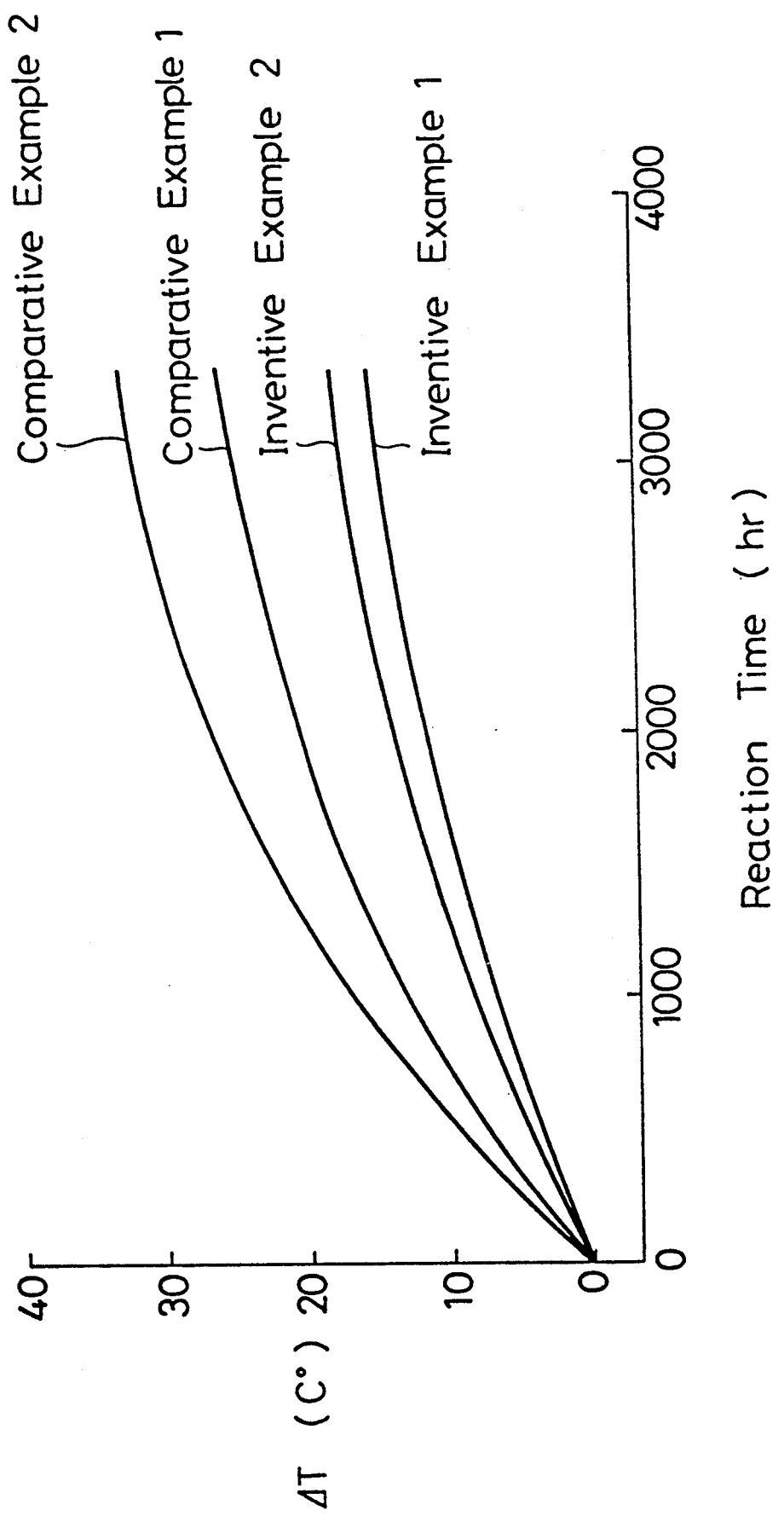

HYDROTREATING CATALYST AND METHOD FOR PREPARATION THEREOF

BACKGROUND OF THE INVENTION

1. Field of the Invention

This invention relates to hydrotreating catalysts and a process of preparing the same. More particularly, the invention is directed to the provision of such a hydrotreating catalyst which is useful for the hydrotreatment of hydrocarbon oils and heavy hydrocarbon oils inter alia containing substantial amounts of sulfur, nitrogen and metallic compounds.

2. Prior Art

Hydrogenation or hydrotreating catalysts introduced to date typically comprise catalyst components selected from Group VIB and Group VIII metals deposited on alumina carriers. Many attempts have been made to improve their catalytic activity and service life. To this end, for example, it is proposed in Japanese Patent Publication No. 56-35893 to use a pseudo-boehmite having a crystal diameter of 40-80Å as an alumina hydrate precursor for a porous alumina carrier. Japanese Patent Laid-Open Publication No. 56-105754 discloses the use of a catalyst carrier comprising boehmite admixed with an organic polymer selected from the group of PVA, polyvinylpyrrolidone, hydroxypropyl cellulose, methylcellulose or mixtures thereof, the boehmite admixture being molded and calcined. U.S. Pat. No. 4,048,060 proposes to use an alumina carrier having a specific pore size distribution. Japanese Patent Laid-Open Publication No. 52-59094 teaches precipitating an alumina hydrate with an aqueous solution containing a water-soluble aliphatic polycarboxylic acid such as gluconic acid having 4-22 carbon atoms.

However, the prior art hydrotreating catalysts have still much to be desired in terms of catalytic activity and service life when used for instance in the hydrodesulfurization of hydrocarbon oils, particularly heavy hydrocarbon oils such as residual oils.

SUMMARY OF THE INVENTION

It is therefore a primary object of the present invention to provide a novel hydrotreating catalyst capable of maintaining enhanced catalytic activity, prolonged service life and increased mechanical strength when used in the hydrotreatment of heavy hydrocarbon oils such as atmospheric and vacuum residua containing sulfur, nitrogen, vanadium, nickel and other metallic contaminants.

It is another object of the invention to provide a process for the preparation of the aforesaid catalysts.

According to the invention, there is provided a hydrotreating catalyst comprising an alumina carrier support with a catalyst component thereon selected from Group VIB and Group VIII metals of the Periodic Table characterized in that the alumina carrier consists of aggregates of fibrous alumina particles having an average particle length (L) of 10-20 nm and at least a 35% portion of the fibrous alumina particles has a length in the range of said average particle length (L)±5nm.

The process of the invention comprises precipitating an alumina hydrate in the presence of an unsaturated hydrocarbon polymer having carboxylic groups or groups of derivatives thereof; washing the resulting alumina hydrate precipitate to remove byproduced salts; subjecting the precipitate to heat aging at a temperature above 50° C. and at a pH of 8-12; and depositing on the resulting alumina carrier a metallic component selected from Group VIB and Group VIII metals of the Periodic Table.

Other objects and features of the invention will appear clear hereinafter.

BRIEF DESCRIPTION OF THE DRAWINGS

FIG. 2 is a graphical display of test results of catalyst service life, showing a temperature rise $(\Delta T)°C$ required to compensate for deterioration of catalytic activity on the ordinate as plotted against reaction time on the abscissa.

DETAILED DESCRIPTION OF THE INVENTION

Figure 1:
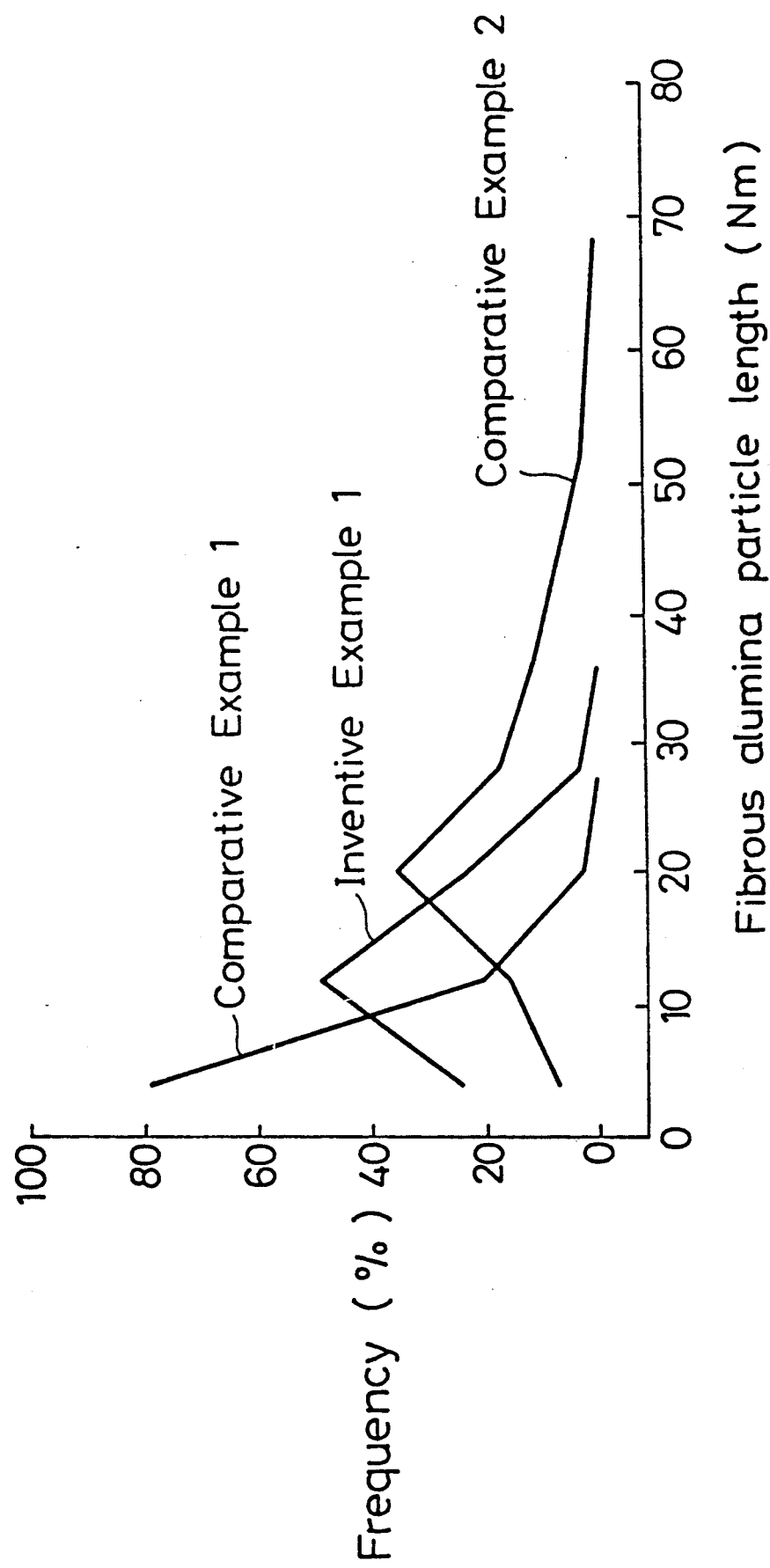
FIG. 1 is a graph depicting a frequency (%) by number of fibrous alumina particles of respective lengths per total number of fibrous alumina particles in their aggregates as plotted on the ordinate against the length (nm) of fibrous alumina particles on the abscissa.

The term fibrous alumina particles is used herein to designate a secondary phase of fibrous particles in which a primary phase of microcrystalline fibrous particles has been flocculated and interlaced in a specific orientation. The length of the fibrous alumina particles is measured by transverse electron microscope (TEM).

The term average length (L) of fibrous alumina particles as used herein designates a length found at a 50% point on the cumulative particle distribution curve plotting respective lengths of selected groups of a total number of fibrous alumina particles observed on micrograph. The total number of fibrous alumina particles just referred to is preferably more than $5 \times 10^3$ to achieve the measurement of the average length (L) of fibrous alumina particles with reasonable accuracy.

It has now been found that the average fibrous alumina particle length (L) in the range of 10-20 nm is an important factor determining the quality of a hydrotreating catalyst in accordance with the principles of the invention. In addition, the fibrous alumina particles provided by the invention are relatively uniform in length compared with conventional counterparts. This is believed to be another factor leading to enhanced catalytic activity particularly in desulfurization processes.

Fibrous alumina particle lengths (L) smaller than 10 nm and larger than 20 nm would result in reduced catalytic activity. It has also been found that the quality of the catalyst declines with alumina carriers having unduely broad distribution in length of the fibrous alumina particles.

The alumina carrier of the invention is prepared by the process in which an alumina hydrate is allowed to precipitate in the presence of an unsaturated hydrocarbon polymer having carboxylic groups or their derivative groups, washed to remove any salts which may have been byproduced and subsequently heated to age with stirring at a temperature higher than 50° C. and at a PH of 8-12.

The unsaturated hydrocarbon polymer referred to herein includes water-soluble polymers or copolymers such as of acrylic acid, methacrylic acid, itaconic acid, citraconic acid, maleic acid, methyl acrylate and ammonium acrylate. Such copolymers may be monomer-to-monomer copolymers of the class mentioned, or other copolymers which are soluble in water. Examples of copolymerizable monomers are acrylnitrile, vinyl acetate, styrene, vinyl chloride, vinylidene chloride, ethylene, propylene, 1-butene, isobutene, 3-methyl-1-butane, 3,3-dimethyl-1-butene, pentene and hexene. The copolymers may be obtained by random, alternating, block or graft copolymerization. The polymers have a molecular weight preferably in the range of $10^2$–$10^6$ and are used in an amount of 0.5–8, preferably 1–4 weight %, based on alumina. The water-soluble polymers above exemplified act as a growth accelerator for the particulate precipitate and also serve to crosslink the formed particles thereby believably rendering the particles rather uniform in length and providing increased mechanical strength of the resultant alumina carrier.

An alumina source includes aluminum sulfate, aluminum nitrate, aluminum chloride and other acidic aluminum salts and alkali metal aluminates. Precipitation of the alumina hydrate is effected by the usual neutralization process, the resulting hydrate precipitate having a pseudo-boehmite crystalline structure. To obtain such alumina hydrates under stable conditions, it is desirable to blend an aqueous acidic aluminum salt with an aqueous alkali metal aluminate in the presence of the aforesaid polymer.

Upon removal of byproduced salts, a slurry of alumina hydrate is stirred under slightly alkaline conditions, say at the pH of 8–12, preferably 9–11 and heated to age at above 50° C., preferably above 80° C. During this treatment, the resulting particulate precipitate grows in the form of a fibrous mass of a relatively uniform length thanks to the growth accelerating effect of the polymer.

The aged alumina hydrate is then dehydrated to a moldable degree and extruded, followed by drying and calcination in a manner well known in the art to produce an alumina carrier. The carrier is deposited with a metallic component selected from Group VIB and Group VIII metals by means of impregnation, dipping, kneading or other known processes. The metallic component typically includes cobalt, nickel, molybdenum, tungsten and the like which is known for use as a hydrotreating catalyst.

The metallic components may be supported on the carrier in an amount used for ordinary hydrotreating catalysts, or preferably in an amount of about 5–30 weight % in terms of oxides.

The hydrotreating catalyst of the invention finds wide application in treating hydrocarbon feedstock, particularly heavy hydrocarbon oils containing sulfur, nitrogen and metallic compounds under an ordinary known set of conditions, typically at a reaction temperature of 350°–430° C., a hydrogen pressure of 100–200 kg/cm$^2$G, a liquid hourly space velocity of a feedstock oil of 0.1–2 hr$^{-1}$, and a hydrogen to oil ratio of 150–1,000 nm$^3$/kl.

The invention will be further described by way of the following examples.

INVENTIVE EXAMPLE 1

80 kg of sodium aluminate solution having an alumina concentration of 5.0 wt% were charged into a stainless tank and heated at 70° C. The solution was held at 70° C. while being stirred and added with acrylic acid polymer (molecular weight 1×10$^4$) in an amount corresponding to 2 wt % of alumina. Aluminum sulphate solution containing 2.5 wt % alumina heated at 70° C. was added over about 10 minutes until the resulting slurry was brought to the pH of 7.0, thereby obtaining an alumina hydrate precipitate in the form of a pseudo-boehmite. The alumina hydrate was filtered by a table filter and washed with 0.2 wt % aqueous ammonia solution heated at 70° C. There was obtained an alumina hydrate containing 0.1 wt % of NaO and 0.3 wt % of SO$_4$. Aqueous ammonia solution was added to adjust the alumina hydrate slurry in pH to 10.5 and in alumina concentration to 8.0 wt %. 75 kg of the alumina hydrate were taken into a tank with reflux and stirrer and allowed to age at 95° C. with stirring for 20 hours. 20 kg of the aged alumina hydrate were taken into 30 l kneader and kneaded with heat until there was obtained a plastic product. This product was extruded to 1/22 inch diameter and dried in the air at 110° C. for 16 hours, followed by calcination at 550° C. for 3 hours to prepare an alumina carrier.

The resulting carrier was examined on transverse electron micrograph for the distribution of particle lengths of the fibrous alumina with results graphically shown in FIG. 1. The average length (L) of the fibrous alumina particles was 12.6 nm, and the proportion of the fibrous alumina particles in the range of 12.6 nm±5 nm was 46.4%.

500 grams of the alumina carrier were impregnated with aqueous ammonium paramolybdenate solution and dried at 110° C. for 16 hours, followed by further impregnation with a aqueous solution of cobalt nitrate and nickel nitrate, drying at 120° C. for 2 hours and calcination at 550° C. for 1 hour. The resulting catalyst was analyzed to show 10.5 wt % of MoO$_3$, 1.2 wt % of CoO and 0.7 wt % of NiO, a pore volume of 0.56 ml/g, a specific surface area of 227 m$^2$/g and a mechanical strength of 1.38 kg/mm.

COMPARATIVE EXAMPLE 1

The procedure of Inventive Example 1 was followed in preparing an alumina carrier, except that gluconic acid was used in place of acrylic acid polymer. The resulting alumina carrier was micrographed for its fibrous particle length distribution as depicted in FIG. 1. The average length (L) of the alumina carrier was 6.0 nm. The proportion of the fibrous alumina particles in the range of 6.0±5 nm was 63.5%.

The procedure of Inventive Example 1 was also followed in preparing a catalyst component to be supported on the alumina carrier. The resulting hydrotreating catalyst had 10.5 wt % of MoO$_3$, 1.2 wt % of CoO and 0.7 wt % of NiO, a pore volume of 0.54 ml/g, a specific surface area of 235 m$^2$/g and a mechanical strength of 0.80 kg/mm.

COMPARATIVE EXAMPLE 2

80 kg of alumina sulphate solution having 2.5 wt % alumina concentration were heated at 70° C. and stirred at that temperature. Gluconic acid was added in an amount corresponding to 2 wt % of alumina. The resulting solution is referred to herein as Solution (A). Whereas, 72 kg of sodium aluminate solution having 5.0 wt % alumina concentration were heated at 70° C. to provide Solution (B). Solutions (A) and (B) were added simultaneously at rates of 1.33 kg/min and 1.20 kg/min, respectively, with the resultant slurry adjusted to the pH of 7.0 to produce an alumina hydrate precipitate. The precipitate was treated in the manner described in Inventive Example 1 to prepare an alumina carrier. The carrier was micrographed for its fibrous particle length distribution as depicted in FIG. 1. The average fibrous particle length (L) of the alumina carrier was 25.0 nm, and the proportion of the fibrous alumina particles in the range of 25.0±5 nm was 24%. The alumina carrier was used in preparing a hydrotreating catalyst in the manner described in Inventive Example 1. The catalyst had 10.5 wt % of $MoO_3$, 1.2 wt % of CoO and 0.7 wt % of NiO, a pore volume of 0.50 ml/g, a specific surface area of 240 m²/g and a mechanical strength of 1.2 kg/mm.

INVENTIVE EXAMPLE 2

80 kg of aluminum sulphate solution having an alumina concentration of 2.5 wt % were charged into a stainless tank and heated at 60° C. The solution was held at 60° C. while being stirred and added with acrylic acid polymer (molecular weight $2 \times 10^4$) in an amount corresponding to 2 wt % of alumina. Sodium aluminate solution containing 5.0 wt % alumina was added over about 10 minutes until the resulting slurry was adjusted to the pH of 7.0, thereby obtaining an alumina hydrate precipitate in the form of a pseudo-boehmite. The precipitate was treated in the same way as noted in Inventive Example 1 to produce an alumina carrier. The carrier was examined for its fibrous particle length distribution to reveal an average length (L) of 18 nm. The proportion of the fibrous alumina particles in the range of 18±5 nm was 37%. A hydrotreating catalyst was prepared with the alumina carrier in the manner described in Inventive Example 1 and analyzed to show 10.5 wt % of $MoO_3$, 1.2 wt % of CoO and 0.7 wt % of NiO, a pore volume of 0.53 ml/g, a specific surface area of 238 m²/g and a mechanical strength of 1.1 kg/mm.

INVENTIVE EXAMPLE 3

80 kg of aluminum sulphate solution having an alumina concentration of 2.5 wt % were charged into a stainless tank and heated at 60° C. The solution was held at 60° C. while being stirred and added with a soluble copolymer (molecular weight $1 \times 10^5$) of methacrylic acid and propylene in an amount corresponding to 2 wt % of alumina. Sodium aluminate solution containing 5.0 wt % alumina was added over about 10 minutes until the resulting slurry was adjusted to the pH of 7.0 thereby obtaining an alumina carrier precipitate in the form of a pseudo-boehmite. The alumina hydrate was treated in the manner of Inventive Example 1 to prepare an alumina carrier. The carrier was examined for its fibrous structure to reveal an average alumina particle length (L) of 15 nm and a proportion of the fibrous alumina particles of 42% in the range of 15±5 nm. A hydrotreating catalyst was prepared in the manner described in Inventive Example 1 and analyzed to show 10.5 wt % of $MoO_3$, 1.2 wt % of CoO and 0.7 wt % of NiO, a pore volume of 0.55 ml/g, a specific surface area of 231 m²/g and a mechanical strength of 0.90 kg/mm.

INVENTIVE EXAMPLE 4 (Evaluation Test)

300 grams of each of the catalysts prepared in Inventive Examples 1-3 and Comparative Examples 1-2 was used for the hydrotreatment of a feedstock oil in a fixed bed reactor measuring 27 mm in outside diameter, 19 mm in inside diameter and 3 meters in length.

| Feedstock Oil | |
|---|---|
| Kuwait atmospheric residuum | |
| Specific gravity (15/4° C.) | 0.985 |
| Sulfur (wt %) | 3.917 |
| Nitrogen (ppm) | 2220 |

| -continued | |
|---|---|
| Asphalten (wt %) | 4.8 |
| Vanadium (ppm) | 60 |
| Nickel (ppm) | 19 |
| Test Conditions | |
| Reaction pressure (kg/cm²) | 150 |
| Liquid hourly space velocity ($hr^{-1}$) | 0.2 |
| Hydrogen/oil ($Nm^3/kl$) | 700 |
| Hydrogen concentration (mole %) | 90 |

Test Results

Each catalyst was tested for its service life with reaction temperature adjusted to bring about 0.25 wt % sulfur in the product oil, with the results shown in FIG. 2. The properties of the product oil contacted with each of the catalysts for 1,000 hours are shown along with respective reaction temperature in Table 1.

TABLE 1

| | Inventive Examples | | | Comparative Examples | |
|---|---|---|---|---|---|
| | 1 | 2 | 3 | 1 | 2 |
| Reaction temperature (°C.) | 380 | 382 | 381 | 386 | 390 |
| Specific gravity (15/4° C.) | 0.920 | 0.919 | 0.920 | 0.920 | 0.918 |
| Sulfur (wt %) | 0.240 | 0.240 | 0.241 | 0.243 | 0.242 |
| Nitrogen (ppm) | 880 | 920 | 922 | 1240 | 1180 |
| Asphalten (wt %) | 1.5 | 1.5 | 1.4 | 1.3 | 1.3 |
| Vanadium (ppm) | 6 | 6 | 6 | 5 | 4 |
| Nickel (ppm) | 3 | 3 | 3 | 3 | 3 |

The data shown in FIG. 2 and Table 1 are clearly in support of the superiority of the inventive hydrotreating catalysts in respect of desulfurization as well as denitrogenation and hence with treatment temperature reduced to a minimum leading to prolonged service life.

What is claimed is:

1. A hydrotreating catalyst comprising an alumina carrier support with a catalyst component thereon selected from Group VIB and Group VIII metals of the Periodic Table characterized in that the alumina carrier consists of aggregates of fibrous alumina particles having an average particle length (L) of 10-20 nm and at least a 35% portion of the fibrous alumina particles has a length in the range of said average particle length (L)±5 nm.

2. A process for the preparation of a hydrotreating catalyst which comprises precipitating an alumina hydrate in the presence of an unsaturated hydrocarbon polymer having carboxylic groups or their derivative groups; washing the resulting alumina hydrate precipitate to remove byproduced salts; subjecting the precipitate to heat aging at a temperature above 50° C. and at a pH of 8-12; drying and calcining said precipitate to obtain an alumina carrier consisting of aggregates of fibrous alumina particles having an average particle length (L) of 10-20 nm and at least a 35% portion of the fibrous alumina particles having a length in the range of said average particle length (L)±5 nm; and depositing on the resulting alumina carrier a metallic component selected from Group VIB and Group VIII metals of the Periodic Table.

3. A process as defined in claim 2 wherein said alumina hydrate is allowed to precipitate by the reaction of an acidic aluminum salt and an alkali metal aluminate.

4. A process as defined in claim 3 wherein said alkali metal aluminate is selected from the group consisting of potassium aluminate and sodium aluminate.

* * * * *